United States Patent [19]
Becker, III

[11] 4,052,081
[45] * Oct. 4, 1977

[54] BUSSING CART

[75] Inventor: Frederick R. Becker, III, Dallas, Pa.

[73] Assignee: Metropolitan Wire Corporation, Wilkes-Barre, Pa.

[*] Notice: The portion of the term of this patent subsequent to Nov. 30, 1990, has been disclaimed.

[21] Appl. No.: 648,726

[22] Filed: Jan. 13, 1976

[51] Int. Cl.² .............................................. B62B 3/02
[52] U.S. Cl. ................................. 280/79.3; 108/111
[58] Field of Search ................ 280/79.3, 47.34, 47.35; 211/186, 133; D12/22, 29, 25; 108/111, 59; 296/3

[56] References Cited

U.S. PATENT DOCUMENTS

| | | | |
|---|---|---|---|
| 2,762,669 | 9/1956 | Watson | D12/25 X |
| 3,330,576 | 7/1967 | Willis | 280/47.34 X |
| 3,570,418 | 3/1971 | Gooding | 108/111 |
| 3,783,801 | 1/1974 | Engman | 108/111 X |
| 3,837,667 | 9/1974 | Sernovitz | 280/47.34 |
| D. 152,666 | 2/1949 | Williams | D12/29 |
| D. 186,306 | 10/1959 | Frick | D12/29 |

Primary Examiner—Robert R. Song
Assistant Examiner—Michael J. Forman
Attorney, Agent, or Firm—Friedman, Goodman & Teitlebaum

[57] ABSTRACT

A cart is disclosed comprising a pair of laterally spaced apart, generally S-shaped side frame members that are joined by transversely oriented connecting rods. In one embodiment, a pair of connecting rods is provided for the upper, the middle, and the lower sections of each side frame member. In an alternative embodiment, only the upper and lower sections are provided with a pair of connecting rods while the middle section is provided with a single connecting rod. In the first mentioned embodiment, a platform is releasably mounted on each pair of connecting rods of each section of the side frame members, in order to support tote boxes, food trays, or the like. In a modification of the first embodiment, the connecting rods may be of double length so that a pair of platforms may be supported at each of the three levels with the pair of platforms at each level being in side-by-side relationship. In the second embodiment, the upper platform is a plate having openings therein for receiving perforated, flanged containers for silverware. The lower platform is a wire frame releasably engaging the two connecting rods that join the lower side frame sections. A back wall, engaging the single middle section connecting rod, is integral with the lower platform. As in the first mentioned embodiment, the connecting rods in the second embodiment may be of double length in order to support pairs of platforms in side-by-side relationship.

14 Claims, 7 Drawing Figures

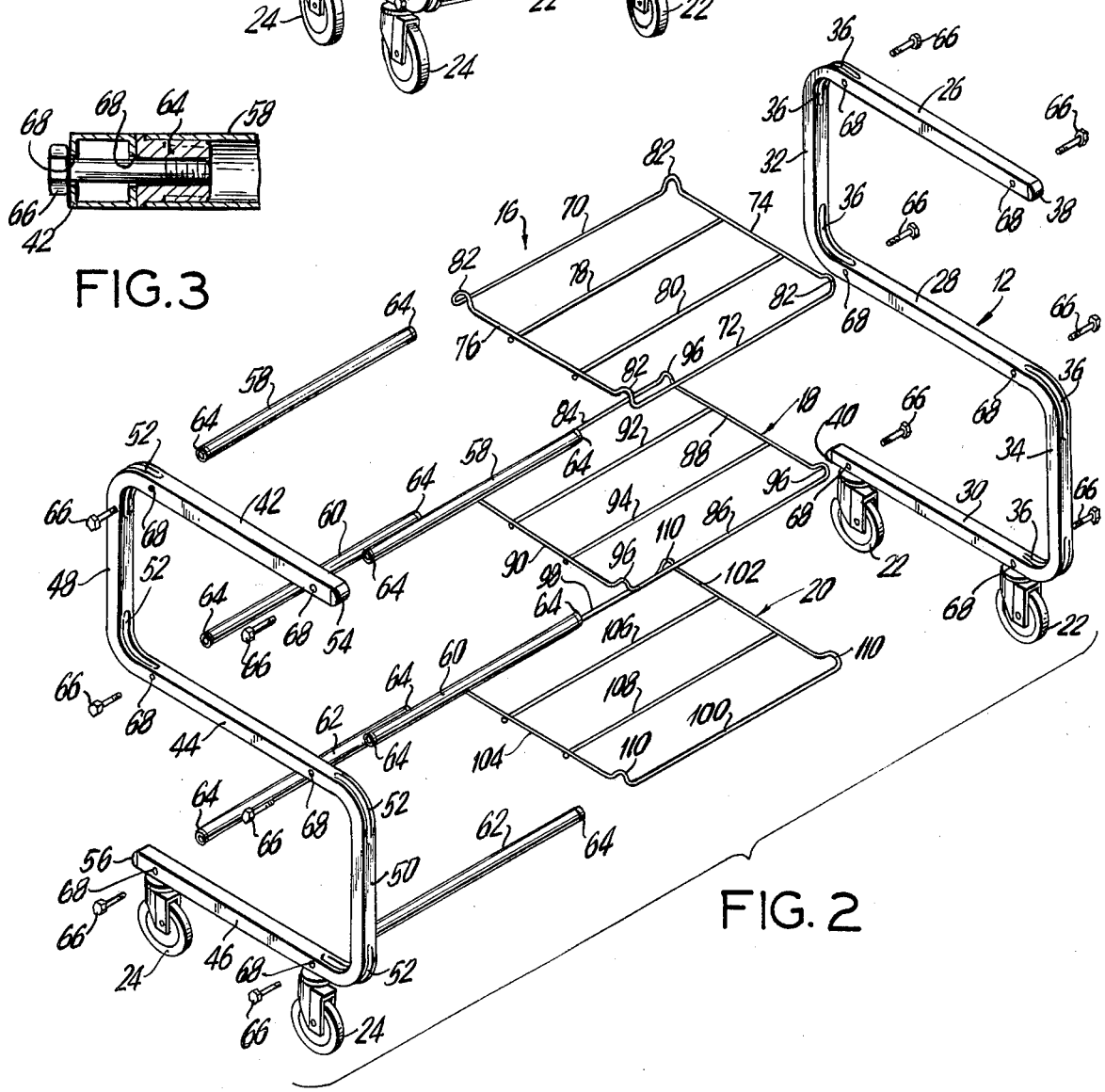

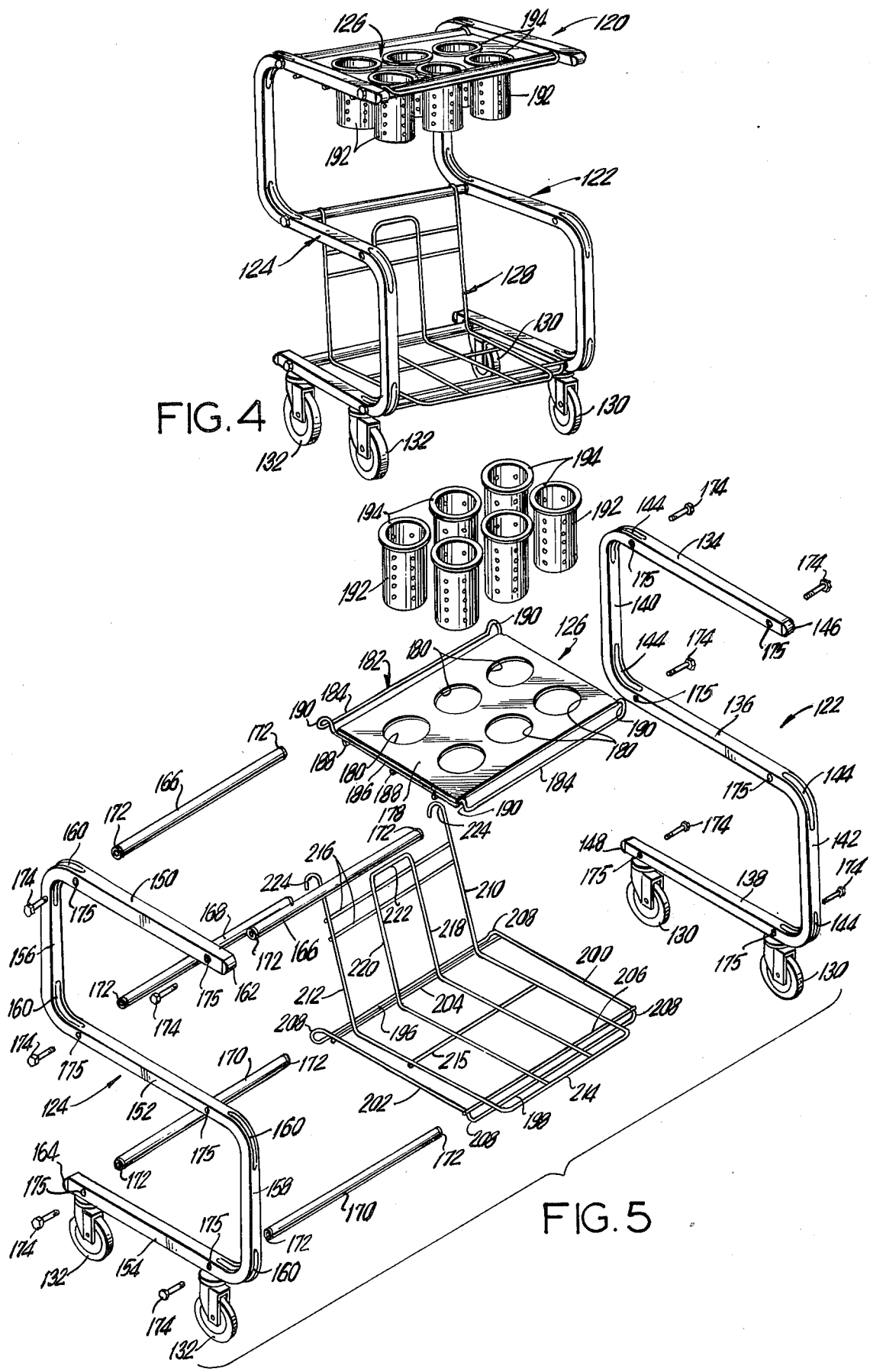

BUSSING CART

BACKGROUND OF THE INVENTION

This invention relates generally to wheeled carts or the like and more particularly to an improved bussing cart.

In restaurants, cafeterias or the like, it is absolutely essential that the soiled dishes and silverware be promptly removed from the tables so that they may be transported to an appropriate area where they may be cleaned and reused. Frequently this operation is performed by the personnel of the restaurant or the cafeteria who carry a large tote box in which the soiled dishes and silverware are placed. For a more efficient operation, a cart may be provided with one or more tote boxes being placed randomly thereon. It will be evident that the carts are not efficiently used and, when one box is piled on top of another it is quite likely that the dishes will be damaged and perhaps rendered completely unusable again. Because little attention has been given in the past to the structure of the bussing cart, they are frequently not used to their maximum capacity, thereby requiring extra trips to and from the dishwashing area with an attendant increase in labor costs.

SUMMARY OF THE INVENTION

The present invention provides an improved cart, such as a bussing cart, that offers convenient access and loading capabilities. The structure comprising the present invention may be used for either tote boxes, food trays, silverware containers and the like. In its broadest aspect the present invention provides a pair of laterally spaced apart, generally S-shaped side frame members that are coupled together by connecting means in the form of a plurality of transverse rods that extend between the side frame members and which are releasably joined thereto by means of fasteners such as screws or the like. Various forms of platform means are provided by the present invention with the platform means resting loosely on the connecting rods so that they may be readily removed and/or interchanged depending upon the requirements of the bussing cart.

For a given degree of strength and support, the S-shaped side frame members of the present invention require a minimum number of sections as compared to conventional E-shaped side frame members. Moreover, since the side frame members are S-shaped in the present invention, the platforms are supported in a cantilevered manner for easy access and loading from all sides and from both the front and the back. The S-shaped side frame members of the present invention may be made from high-strength tubular steel that is plated for the purpose of providing an aesthetically appearing structure.

The construction of the present invention provides the important advantage of requiring a minimum of skill for the assembly thereof, utilizing only the simplest of tools such as a screwdriver, a wrench or the like. Since the cart comprising the present invention may therefore be shipped in a knocked-down condition, it will be appreciated that shipping costs are minimized since, frequently, shipping costs are determined by volume and not necessarily by weight. Thus, the carton containing either a single cart or a plurality of carts may be made quite small as compared to the carton that would be required if the cart were shipped in its fully erected condition. In spite of the fact that the cart of this invention may be shipped knocked-down and may be easily erected without special skills or tools, the fully erected cart exhibits a high degree of structural rigidity because of the cantilevered construction of the side frame members.

In one embodiment of the present invention, the platform means are comprised a wire frame having two spaced apart side sections and spaced apart front and rear sections. A plurality of wire rods extending in the width direction of the cart may be welded or otherwise suitably secured to the peripheral side sections of the platform means. In addition, the wire frame portions of the platform means is crimped or bent to provide a plurality of arcuate sections that are arranged to rest on the connecting rods that extend between the side frame members. Thus, the platform means that support the tote boxes or food trays may be easily removed for thorough cleaning. This first mentioned embodiment of the present invention is provided with three platforms that extend, respectively, between the upper, middle and lower sections of the side frame members. As a modification thereof, the connecting rods may be made in double lengths so that a pair of platform means may be mounted side-by-side on each of the aforementioned pairs of connecting rods. Casters that are suitably secured to the lower section of each of the side frame members provide maximum mobility for the cart.

In contrast to the first embodiment of this invention which comprises pairs of connecting rods between each of the three side frame sections, a second embodiment of the present invention provides a pair of connecting rods only between the upper and lower sections of the side frame members. The middle sections of the side frame members are connected by a single rod so that platform means are provided only on the upper and lower pairs of connecting rods. In the second embodiment of this invention, the upper platform may be in the form of a plate having means integral therewith that permit the mounting of the plate on the upper pair of connecting rods in much the same manner as described in connection with the first embodiment of this invention. That is, front and rear wire rods are secured to the plate in spaced relation thereto and the wire rods are suitably bent or crimped to provide arcuate sections that may rest on the connecting rods. The lower platform may also be in the form of a wire frame having the aforementioned means for permitting the mounting thereon on the lower pair of connecting rods.

A rear wall that is also made of wire rods is integrally formed with the other platform and is provided with hooks at the upper end thereof so that the lower frame, in addition to resting on the lower pair of connecting rods, may also be hooked onto the single rod that connects the middle sections of the side frame members in the second embodiment. Thus, a plurality of tubular, flanged and perforated containers for receiving various types of silverware may be removably mounted on the upper platform while the lower platform may be utilized for carrying oversized objects as well as tote boxes and food trays. The second embodiment may also be made with double length connecting rods so that a pair of each type of platform may be mounted thereon. Similarly, the side frame members of the second embodiment of this invention are made of tubular steel that is appropriately plated, and casters may be provided for the second embodiment of this invention. It will be appreciated that while the lower platform of the second embodiment of this invention cannot be loaded from the rear, it can be loaded from either side as well as from the front. It should be further noted that the S-shape side frame members provide the same cantilever construction for strength and easy access as described in connection with the first embodiment of this invention.

Accordingly, it is an object of the present invention to provide an improved cart.

It is another object of the present invention to provide an improved cart as described above, having S-shaped side frame members.

A further object of the present invention is to provide an improved cart, as described above, wherein the side frame members provide maximum strength and support with a minimum number of parts.

It is a further object of the present invention to provide an improved cart, as described above, that may be readily assembled using only simple tools and requiring a minimum of skill.

It is a further object of the present invention to provide an improved cart, as described above, that may be shipped in the knocked-down condition and thereby minimize shipping costs due to the relatively small volume container required for shipment.

Yet another object of the present invention is to provide an improved cart, as described above, wherein the side frame members are made from tubular steel for maximum strength and rigidity.

A further object of the present invention is to provide an improved cart, as described above, wherein the platform means may be readily removed for cleaning.

Still another object of the present invention is to provide an improved cart, as described above, wherein at least one of the platforms are made from a wire frame having means integral therewith that permit mounting on the connecting rods between the side frame members without additional tools or hardware.

A specific object of the present invention is to provide an improved cart, as described above, having platform means that are adapted to hold a plurality of removable containers for silverware or the like.

A further object of the present invention is to provide an improved cart, as described above, that may readily be made in double width sizes in order to permit the side-by-side support of trays, tote boxes or silverware containers on the platform means thereof.

It is still another object of the present invention to provide an improved cart, as described above, that is readily mobile.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective view illustrating a first embodiment of the present invention;

FIG. 2 is an exploded perspective view illustrating the embodiment of the present invention shown in FIG. 1;

FIG. 3 is a fragmentary sectional view taken along line 3—3 of FIG. 1;

FIG. 4 is a perspective view illustrating a second embodiment of the present invention;

FIG. 5 is an exploded perspective view illustrating the embodiment of the present invention shown in FIG. 4;

In the various figures of the drawing, like reference characters designate like parts.

DESCRIPTION OF THE PREFERRED EMBODIMENT

Figure 6:
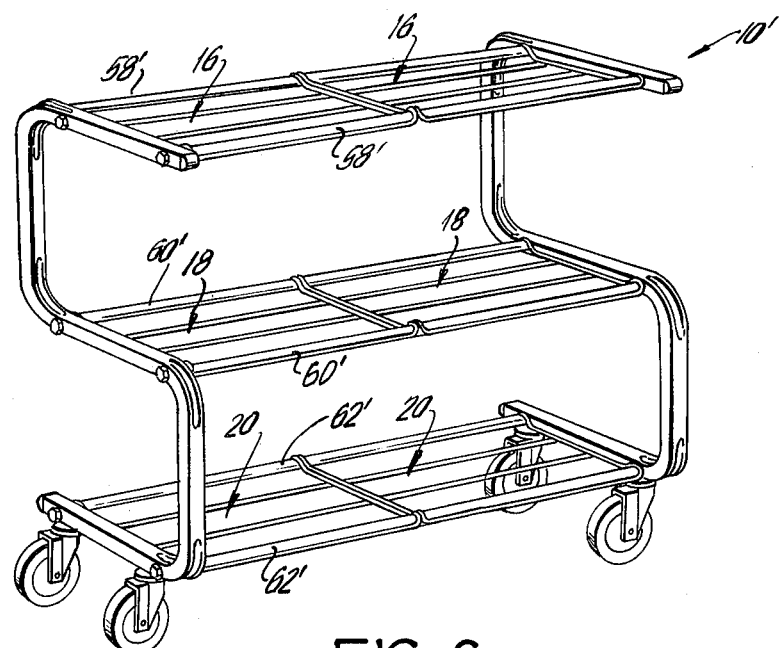
FIG. 6 is a perspective view illustrating a modification of the first embodiment of the present invention in FIG. 1.

Referring first to FIG. 1, there is shown an improved cart, such as bussing cart 10 comprising the first embodiment of the present invention. The bussing cart 10 includes identical right and left hand side frame members 12 and 14, respectively, as well as identical upper, middle and lower platform means 16, 18 and 20, respectively. Preferably, the side frame members 12 and 14 may be made of tubular steel that is suitably plated, and the platform means 16, 18 and 20 may be made of wire rods that are also suitably plated. A pair of swivel casters 22 are secured to the right hand side frame member 12 and another pair of swivel casters 24 are secured to the left hand frame member 14 in a suitable manner well known in the art in order to provide maximum mobility for the bussing cart 10.

The construction as well as the manner of assembly and disassembly of the bussing cart 10 shown in FIG. 1 may best be understood by reference now to FIG. 2 and to FIG. 3. It will be seen that the right hand side frame member 12 is S-shaped and is comprised of upper, middle and lower sections 26, 28 and 30, respectively, that are substantially horizontal. A first, vertically oriented end section 32 joins the upper and middle sections 26 and 28 and a second, vertically oriented end sections 34 joins the middle and lower sections 28 and 30 respectively. Since the sections 26, 28 and 30 are in substantially horizontal planes that are parallel to each other and since the sections 32 and 34 are in substantially vertical planes that are parallel to each other, the five sections 26-34 define a frame that is in the shape of an S. Crimps 36 are placed at the juncture of each adjacent horizontal and vertical hollow side frame section in order to provide additional rigidity thereto and to resist bending of the sections relative to each other. Resilient bumper means 38 and 40 are secured to the free extremity of the upper and lower sections 26 and 30 respectively.

The left hand side frame member 14, being identical to member 12, is also formed in te shape of an S and may also be made of hollow tubular steel. The left hand side frame member 14 includes upper, middle, and lower sections 42, 44 and 46, respectively, which are in substantially horizontal planes and which are parallel to each other. A first, generally vertically oriented frame section 48 connects the upper and middle frame sections 42 and 44 while a second, vertically oriented frame section 50 connects the middle and lower frame sections 44 and 46 respectively. For stiffening purposes and to provide maximum rigidity, crimps 52 are placed at the juncture of each adjacent horizontal and vertical hollow side frame section. In addition, resilient bumper means 54 and 56 are secured to the free extremity of the upper and lower side frame sections 42 and 46 respectively.

The side frame members 12 and 14 are secured to each other in laterally spaced apart relationship by means of three pairs of identical hollow tubular connecting rods that join each section of the side frame members 12 and 14. A pair of upper connecting rods 58 extend between the upper side frame sections 26 and 42. A pair of middle connecting rods 60 extend between the middle side frame sections 28 and 44, and a pair of lower connecting rods 62 extend between the lower side frame sections 30 and 46. In each instance, the connecting rods are secured to their respective side frame sections by means of internally threaded plugs 64 and mating bolts 66 such as is shown typically in FIG. 3. The connecting rods 58, 60 and 62 are identical and therefore may be interchanged with each other in the construction of the cart 10, the same being possible with the frame members 12 and 14.

The plug 64 is force-fit into the ends of each of the hollow connecting rods, for example, connecting rod 58 shown in FIG. 3. The bolt 66 extends through aligned clearance holes 68 formed in opposed walls of the horizontal frame sections, for example the upper section 42 on the left hand side frame member 14. In order to minimize assembly time and to simplify the assembly, the plugs 64 may be press fit or otherwise non-rotatably secured within the two ends of each of the connecting rods prior to shipping. Additionally, each plug 64 is provided with a flanged outer surface or rim which abuts against the outer end of each associated connecting rod to position the plug at the end thereof.

As shown for example in FIG. 2, the upper platform means 16 is comprised of a wire rod frame that includes spacedly opposed and generally parallel end sections 70 and 72, and spaced opposed and parallel side sections 74 and 76, all of which may be formed from a continuous rod which is butt or lap welded at the ends thereof or otherwise suitably secured. Spanning rods 78 and 80 may also be suitably secured, such as by welding, brazing or the like to the side sections 74 and 76. Proximate each juncture of a side and end section of the upper platform 16 there is provided a crimp in the form of an arcuate or bend section 82 whose radius is at least as great and preferably slightly greater than the radius of the pair of upper connecting rods 58 (by way of example) so that the upper platform 16 may be easily placed thereon and just as easily removed therefrom for cleaning purposes.

The middle platform 18 is also made in the same manner as and is identical to the upper platform 16, and is comprised of end sections 84 and 86; side sections 88 and 90; and spanning rods 92 and 94. The sections 84, 86, 88 and 90 may all be made from a single, formed wire rod that is butt welded, brazed, etc. at the ends thereof, and the spanning rods 92 and 94 may be welded to the side sections 88 and 90. At the juncture of each pair of adjacent peripheral sections of the middle platform 18 there is provided a crimp or arcuately bend section 96 that has a radius that is at least the same or which is slightly larger than the radius of the pair of middle connecting rods 60 so that the middle platform 18 may be easily placed thereon and removed therefrom.

In the same manner, the lower platform 20 is identical to the above mentioned platforms, being formed of four peripheral sections, namely end sections 98 and 100 and side sections 102 and 104 all of which may be formed from a single bent wire rod that is butt or lap welded at its ends. Spanning rods 106 and 108 may be suitably welded to the side sections 102 and 104 while at the juncture of each pair of adjacent, peripheral sections a crimp 110 having a radius the same as or slightly larger than the lower the radius of the pair of connecting rods 62 is provided so that the lower platform 20 may be easily placed thereon and removed therefrom.

The second embodiment of the present invention comprising a bussing cart 120 is shown in FIG. 4 and in FIG. 5. The bussing cart 120 includes identical right and left hand S-shaped side frame members 122 and 124, which are identical to above mentioned members 12 and 14, as well as upper and lower platforms 126 and 128. A pair of rollable swivel casters 130 are secured to the right hand side frame member 122 and a pair of rollable swivel casters 132 are secured to the left hand side frame member 124. It is noted that the casters 22, 24, 130 and 132 are identical.

The right hand side frame member 122 is comprised of hollow upper, middle and lower sections 134, 136 and 138, respectively, which are all in generally horizontal planes and which are substantially parallel to each other. A first, generally vertically oriented hollow section 140 joins the upper and middle sections 134 and 136 while a second, generally vertically oriented hollow section 142 joins the middle and lower sections 136 and 138. In order to provide stiffening and rigidity, crimps 144 are placed at the juncture of each adjacent horizontal and vertical hollow section. In addition, a resilient bumper 146 is placed at the free extremity of the upper section 134 while a similar, resilient bumper 148 is placed at the free extremity of the lower section 138.

The left hand side frame member 124 is identical to member 122, being comprised of hollow upper, middle and lower sections 150, 152 and 154, respectively, all of which are in generally horizontally planes and all of which are generally parallel to each other. A first, generally vertically oriented hollow section 156 joins the upper and middle sections 150 and 152, respectively, while a second, generally vertically oriented hollow section 158 joins the middle and lower sections 152 and 154, respectively. In order to provide sufficient rigidity and stiffness, crimps 160 are placed at the juncture of each adjacent horizontal and vertical hollow section. In addition, a resilient bumper 162 is placed at the free extremity of the upper section 150 while another resilient bumper 164 is placed at the free extremity of the lower section 154.

In the second embodiment of the present invention a pair of upper hollow connecting rods 166 extend between and join the upper sections 134 and 150 of the side frame members 122 and 124, respectively. In contrast to the first embodiment, only a single, middle hollow connecting rod 168 extends between and joins the middle sections 136 and 152 of the right and left hand side frame members 122 and 124, respectively. The middle connecting rod 168 is positioned adjacent the juncture of the middle sections 136 and 152 and their respective, adjacent vertical sections 140 and 156. A pair of lower hollow connecting rods 170 are used for joining the lower sections 138 and 154 of the right and left hand side frame members 122 and 124. In the same manner as described in connection with the first embodiment, non-rotatable and internally threaded plug means 172 are placed in each end of the pairs of connecting rods 166, 168 and 170 in order to threadably receive bolts 174 that pass through aligned openings 175 in the opposed walls of the horizontal hollow sections 134, 136, 138, 150, 152 and 154. It is noted that the connecting rods 58, 60, 62, 166, 168 and 170 are identical, as well as the plug means 64 and 172 being identical, in addition to the bolts 66 and 174 being identical.

The upper platform 126 is comprised of a plate 178 having a plurality of openings 180 formed therein. The plate 178 is suitably secured, for example by welding, brazing or the like, to a wire rod frame generally designated by the reference character 182. The wire rod frame 182 includes a pair of parallel, spaced apart end sections 184 and a pair of parallel, spaced apart side sections 186, only one of which is visible. The sections 184 and 186 may be formed of a single length of bent wire rod which is butt or lap welded at the ends thereof. A plurality of spanning rods 188 extend between and are welded, brazed or otherwise suitably secured to the side sections 186 in order to provide stiffness to the plate 178. At the juncture of adjacent sections 184 and 186 the peripheral wire rod frame 182 is provided with crimps or arcuate sections 190 each having a radius that is at least as great or slightly greater than the radius of the connecting rods 166 so that the upper platform 126 may be placed thereon and removed therefrom with ease. The opening 180 and used to receive a plurality of perforated silverware containers 192, each of which has a flange 194 at the top, open end thereof, to support the containers in the openings, the flange being larger than the opening.

The lower platform 128 is in the form of a wire rod construction and includes a generally horizontal portion that is comprised of a pair of parallel, spaced apart end sections 196 and 198 as well as a pair of parallel, spaced apart side sections 200 and 202, all of which may be made from a single length of wire rod that is suitably bend and is butt or lap welded or otherwise secured at the ends thereof. Spanning rods 204 and 206 extend between the side sections 200 and 202 and are suitably secured thereto such as by welding, brazing or the like in order to provide stiffness. At the juncture of each pair of peripheral sections, a crimp 208 is formed having a radius that is approximately the same as or slightly greater than the radius of the pair of connecting rods 170 so that the lower platform means 128 may be placed thereon and readily removed therefrom for purposes of cleaning, for example.

The lower platform 128 also includes a generally vertical and horizontal L-shaped portion that is comprised of a pair of spaced apart and parallel side sections 210 and 212 that are joined at one horizontal end thereof by an end section 214. The side sections 210 and 212 are bent almost to a 90° angle and are suitably secured, such as by welding, brazing or the like, to the spanning rods 204 and 206. A spanning rod 215 and another pair of spanning rods 216 extend between and are secured, such as by welding, brazing or the like, to the side sections 210 and 212, the rod 215 being on the horizontal part and the rods 216 being on the vertical part thereof.

Still another pair of intermediate sections 218 and 220, which are also bent at approximately 90° to a L-shape, are secured transversely in the horizontal position thereof, such as by welding, brazing or the like to end section 214 and to the spanning rods 204 and 206. The intermediate sections 218 and 220 are parallel to and inward of the side sections 210 and 212 and are also welded, brazed or otherwise suitably secured in the vertical position thereof to the spanning rods 216. A section 222 is made integral with and joins the intermediate section 218 and 220 proximate the spanning rods 216. Finally, the generally vertical portion of the side sections 210 and 212 are provided with hooks 224 each of which has a radius approximately the same as or slightly greater than the radius of the single connecting rod 168 so that the lower platform 128 may also be hooked thereto in a removable manner.

A modification 10' of the first embodiment of this invention is shown in FIG. 6. All of the structure as well as the method of assembly and disassembly is the same as that described in connection with the embodiment of FIG. 1 and therefore will not be repeated. The only difference in the FIG. 6 modification is that the pairs of connecting rods 58', 60' and 62' are twice the length of the pairs of connecting rods 58, 60 and 62 so that a pair of platform means 16, 18 and 20 can be mounted respectively on each pair of connecting rods to hold twice as many tote boxes, which are relatively deep or food trays, which are relatively shallow. The tote boxes or food trays are mounted on each of the pairs of platform means 16, 18 and 20 in the same manner as a single tote box or a single food tray is mounted in the embodiment shown in FIG. 1. Thus, the six connecting rods of the FIG. 1 embodiment are replaced by six longer connecting rods as shown in FIG. 6 to hold additional platforms.

Figure 7:
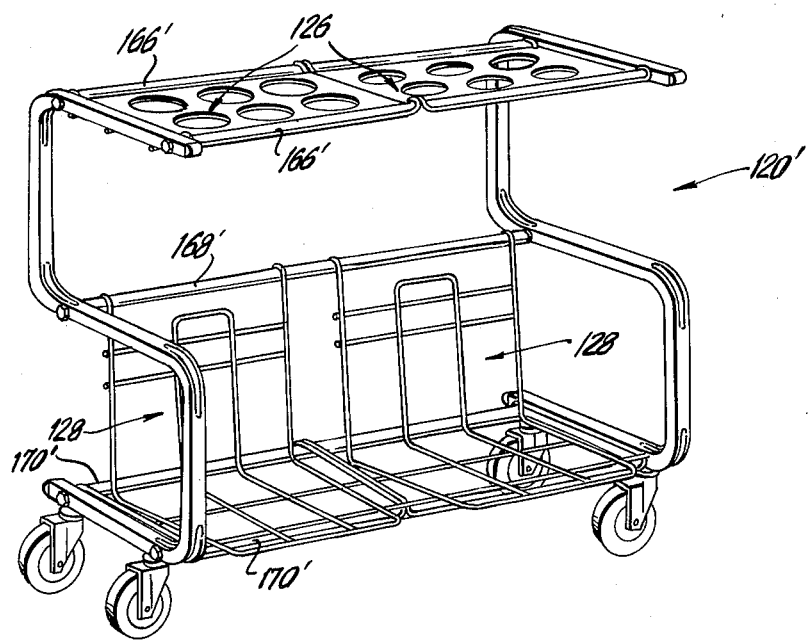
FIG. 7 is a perspective view illustrating a modification of the second embodiment of the present invention shown in FIG. 4.

Similarly, FIG. 7 illustrates a modification 120' of the second embodiment of the invention shown in FIG. 4. The structure shown in FIG. 7 is substantially the same as that shown in FIG. 4 and therefore will not be repeated except for the description of the pairs of connecting rods 166', the single connecting rod 168' and the pair of connecting rods 170'. It will be noted in the FIG. 7 embodiment that these connecting rods are twice the length of those shown in the FIG. 4 embodiment so that a pair of upper platforms 126 may be supported thereon as well as a pair of lower platforms 128. Thus, the five connecting rods of the FIG. 4 embodiment are replaced by five longer connecting rods as shown in FIG. 7 to hold additional platforms. It is also noted that the modified connecting rods 58', 60', 62', 166', 168' and 170' are identical.

There are many potential applications suggested for the use of the present invention in addition to being used as a bussing cart, as mentioned above. Because of its simplicity and the ability to easily change the wire fabric inserts, the present invention is extremely flexible. Possible applications include a general purpose cart for flower and medication delivery, and for use in computer rooms for storing and transporting cards and tapes.

Numerous alterations of the structure herein disclosed will suggest themselves to those skilled in the art. However, it is to be understood that the present disclosure relates to a preferred embodiment of the invention which is for purpose of illustration only and is not to be construed as a limitation of the invention.

What is claimed is:
1. A cart comprising:
  a. a pair of laterally spaced apart, generally S-shaped side frame members;
  b. connecting means extending between said side frame members for securing one side frame member to the other side frame member, said connecting means including a plurality of spaced apart rods of equal length and fastener means for securing said rods to said side frame members;
  c. platform means for supporting articles extending between said side frame members and being supported on said connecting means;

d. each of said side frame members including vertically spaced apart upper, middle and lower sections that are disposed parallel to each other in substantially horizontal planes, a first substantially vertical section connecting said upper and middle sections, and a second substantially vertical section connecting said middle and lower sections to provide a S-shaped configuration;

e. a first pair of said rods being secured to each of said upper sections and a second pair of said rods being secured to each of said lower sections of said side frame members, and at least one of said platform means being mounted on one of said pairs of rods;

f. said at least one of said platform means including opposite end portions provided with hook-shaped engaging means for releasably engaging each rod of said one of said pairs of rods; and g. rollable caster means for rolling said cart being secured to said side frame members, said rollable caster means including a pair of spaced apart casters disposed on each of said lower sections of said side frame members.

2. A cart according to claim 1, wherein said rods are tubular, an internally threaded plug being positioned in each end of said rod, said fastener means passing through aligned openings in said side frame members and being threadedly engaged in said plugs.

3. A cart according to claim 1, wherein there are two of said platform means mounted side-by-side on said one of said pairs of rods.

4. A cart according to claim 1, wherein each said platform means comprises a wire rack including said engaging means for releasably engaging said rods.

5. A card according to claim 4, wherein each said wire rack includes a peripheral frame and said engaging means comprises a pair of opposed crimped areas in said frame for each said rod.

6. A cart according to claim 1, wherein there is further included resilient bumper members secured to said side frame members at upper and lower extremities thereof.

7. A cart according to claim 1, wherein a single rod is secured between said middle sections of said side frame members, one of said platform means being mounted on said rods between said lower sections and another of said platform means being mounted on said rods between said upper sections.

8. A cart according to claim 7, wherein said upper section platform means comprises plate means having a plurality of openings therein for receiving a plurality of flanged, perforated silverware cylinders, said plate means including said engaging means for releasably engaging said pair of rods extending between said upper sections of said side frame members.

9. A cart according to claim 8, wherein a pair of said plate means are mounted in side-by-side relationship on said rods between said upper sections.

10. A cart according to claim 7, wherein said lower section platform means comprises a wire frame said engaging means for releasably engaging said pair of rods extending between said lower sections of said side frame members.

11. A cart according to claim 10, wherein said wire frame further includes a substantially upright section and means thereon for releasably engaging said single rod extending between said middle sections of said side frame members.

12. A cart according to claim 11, wherein there are a pair of said wire frames mounted in side-by-side relationship on said rods between said lower sections and engaging said single rod.

13. A cart according to claim 1, wherein a third pair of said rods is secured to each of said middle sections of said side frame members.

14. A cart according to claim 13, wherein at least one of said platform means is mounted on each of said first, second and third pairs of rods.

* * * * *